No. 642,144. Patented Jan. 30, 1900.
C. MELLISH.
SUPPORT FOR BICYCLES.
(Application filed June 12, 1899.)
(No Model.)
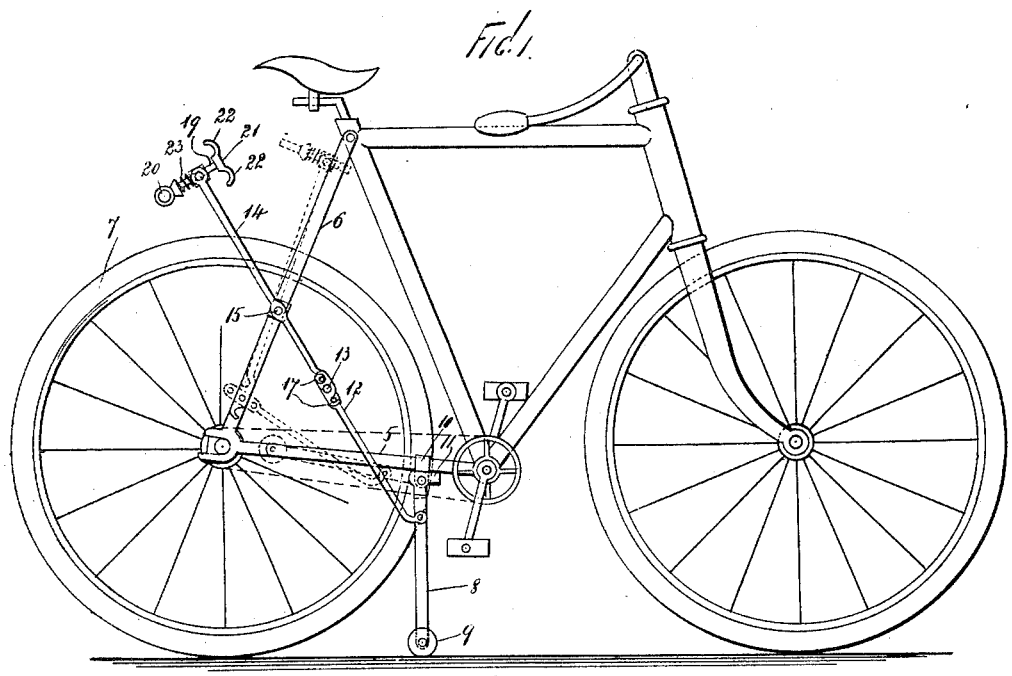
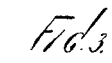
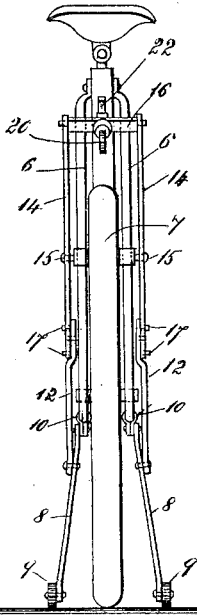
WITNESSES
INVENTOR
Charles Mellish,
BY
Edgar Tate & Co.
ATTORNEYS

UNITED STATES PATENT OFFICE.

CHARLES MELLISH, OF NEW YORK, N. Y.

SUPPORT FOR BICYCLES.

SPECIFICATION forming part of Letters Patent No. 642,144, dated January 30, 1900.

Application filed June 12, 1899. Serial No. 720,160. (No model.)

*To all whom it may concern:*

Be it known that I, CHARLES MELLISH, a citizen of the United States, residing at New York, (Brooklyn,) in the county of Kings and State of New York, have invented certain new and useful Improvements in Supports for Bicycles and Similar Vehicles, of which the following is a full and complete specification, such as will enable those skilled in the art to which it appertains to make and use the same.

This invention relates to supports for bicycles and similar vehicles, and has more particular reference to a foldable support of this class which is secured to the frame of the vehicle and may be readily thrown into operation, so as to support the vehicle in an upright position when the latter is not in use and folded up adjacent the parts of the frame of the vehicle when said vehicle is in use.

The object of this invention is to provide a support of the class described which may be permanently connected with and carried by the vehicle in connection with which it is used and shall present a sightly appearance and be of light weight; and with these and other objects in view the invention consists in the construction and arrangement of parts fully described in the following specification, of which the accompanying drawings form a part, and in which like reference characters denote like parts in the several views, and in which—

Figure 1 is a side elevation of a bicycle provided with my improved support, which is shown in operative position in full lines and in inoperative or folded position in dotted lines; Fig. 2, a rear view of the same, and Fig. 3 an enlarged view of a detail of construction.

Referring more particularly to the drawings, I have shown a bicycle provided with the usual diamond frame, having the rear longitudinal members 5 and rear upright members 6, between which is mounted the drive-wheel 7.

In the practice of my invention I provide a bicycle-support which may be detachably connected with the frame members 5 and 6 and is so shown in the drawings, and the construction of which is as follows: I provide a pair of legs or rods 8 8, each of which is provided at its lower end with a roller 9 and at its upper end with a clamp 10, by which the legs 8 may be secured to the frame members 5, as shown. The legs 8 are pivotally connected with the clamps 10 and are provided with elongated heads 11, which are set at a slight angle thereto and operate in connection with the frame members 5 to limit the forward pivotal movement of said legs.

Pivotally connected at one end with each of the legs 8 is a link-rod 12, preferably slightly curved adjacent said pivotal point, and I pivotally connect with the other end of each of said link-rods one end of an operating-rod 14, which is provided approximately centrally with a clamp 15, by means of which it may be detachably connected with one of the frame members 6, as shown in the drawings. The other ends of the operating-rods 14 are connected by a cross-head 16.

Each of the link-rods 12, as shown in Fig. 3, is provided at either side of its pivotal connection with the operating-rod 14 with a pin 17, and each of the operating-rods 14 is provided with corresponding recesses 8, arranged, respectively, on either side thereof and in connection with which the pins 17 are adapted to operate to limit the pivotal movement of the rods 12 and 14, as shown in the drawings.

Passed loosely through the cross-head 16 is a pin 19, provided at one end with a handle 20 and at the other end with a gripping-head 21, consisting of laterally-arranged segmental members 22. A coil-spring 23 is mounted upon the pin 19 between the cross-head 16 and handle 20 and normally forces the latter away from said cross-head.

In the use and operation of my support it is connected with the bicycle, as shown in the drawings, and the clamps 10 and 15 are so adjusted along and secured to the members 5 and 6 that when the parts of the support are folded, as shown in dotted lines in Fig. 1, the operating-rods 14 shall extend adjacent and approximately parallel with the frame members 6. With the parts in the position shown in dotted lines the segmental members 22 of the grip-head 21 extend beyond and in connection with the frame members 6 and the spring 23 draws the latter into close engagement with the cross-head 16. To bring the members 22 into this position, the pin 19 is turned into the position shown in full lines, when said members may be readily passed between the frame members 6, and when the pin 19 is again turned to bring said members into the position shown in dotted lines the link-rods 12 will have been drawn rearwardly and the legs 8 elevated, the device being thus drawn into inoperative position.

When it is desired to support the vehicle in an upright position, the pin 19 is forced forwardly to withdraw the segmental members 22 from the frame members 6, and is then turned to throw the latter into the position shown in Fig. 2, when the cross-head 16 may be withdrawn from the frame members 6, forcing the link-rods 12 forwardly and lowering the legs 8 until the rollers 9 bear upon the surface of the floor, earth, or other support upon which the bicycle may be resting, this latter position of the parts being shown in full lines in Figs. 1 and 2. When the legs 8 reach a vertical position, the pins 17 will pass into the recesses 18 in the operating-rod 14 and limit the movement of the parts, as shown. The clamps 10 are preferably beveled rearwardly upon the portion thereof which the heads of the legs 8 engage, so that as said legs are drawn upward they will be drawn as well into position adjacent the frame members 5.

My invention is simple in construction and well adapted to accomplish the purpose in view, and it is evident that many changes may be made in the construction and operation thereof without departing from the spirit of my invention or sacrificing the advantages thereof.

Having fully described my invention, I claim as new and desire to secure by Letters Patent—

1. An apparatus for holding bicycles in an upright position, comprising rods pivotally connected with the sides of the upright rear fork of the frame of the vehicle, legs pivotally connected with the sides of the lower horizontal fork adjacent to the support of the pedal-shaft, rods pivotally connected with said legs and with said first-named rods, said first-named rods being also connected at their upper ends and provided with a spring-catch, and a clamp secured to the rear upper fork adjacent to the seat-support, and with which said spring-catch is adapted to engage, substantially as shown and described.

2. An apparatus for holding a bicycle in an upright position, comprising legs pivotally connected with the sides of the lower horizontal fork adjacent to the support of the pedal-shaft and provided at their lower ends with rollers, rods pivotally connected with said legs adjacent to their pivotal supports, other rods pivotally connected with said first-named rods and also pivotally connected with the sides of the upper rear fork, said last-named rods being connected at their upper ends and provided with a spring-operated catch, and a clamp secured to the frame of the vehicle below the seat-support, and with which said spring-catch is adapted to engage, substantially as shown and described.

3. An apparatus for holding a bicycle in an upright position, comprising legs pivotally connected with the sides of the lower horizontal fork adjacent to the support of the pedal-shaft and provided at their lower ends with rollers, rods pivotally connected with said legs adjacent to their pivotal supports, other rods pivotally connected with said first-named rods and also pivotally connected with the sides of the upper rear fork, said last-named rods being connected at their upper ends and provided with a spring-operated catch, and a clamp secured to the frame of the vehicle below the seat-support, and with which said spring-catch is adapted to engage, the rods which are pivotally connected with said legs and with said upright fork being so connected as to turn in one direction only, substantially as shown and described.

In testimony that I claim the foregoing as my invention I have signed my name, in presence of the subscribing witnesses, this 9th day of June, 1899.

CHARLES MELLISH.

Witnesses:
F. A. STEWART,
C. C. OLSEN.